United States Patent [19]

Gadde et al.

[11] 4,386,676
[45] Jun. 7, 1983

[54] SOUND-DAMPING MAT OR DRAPE

[76] Inventors: Villy Gadde, Bergsgatan 4B, S-593 00 Västervik; Jan E. Larsson, Hagtornsvägen 10, S-594 00 Gamleby, both of Sweden

[21] Appl. No.: 204,479

[22] Filed: Nov. 6, 1980

[30] Foreign Application Priority Data

Nov. 19, 1979 [SE] Sweden .................................. 7909573

[51] Int. Cl.³ .............................................. E04B 1/82
[52] U.S. Cl. .................................... 181/290; 181/293; 181/294
[58] Field of Search ................ 181/207, 208, 284, 286, 181/290, 294, 296; 428/313.7, 313.9, 317.3, 317.7, 317.9, 318.4; 138/DIG. 2

[56] References Cited

U.S. PATENT DOCUMENTS 2,517,753 8/1950 Ximenez et al. ............. 138/DIG. 2
4,013,810 3/1977 Long ............................ 428/313.9 X
4,101,704 7/1978 Hiles ............................ 428/313.9 X

FOREIGN PATENT DOCUMENTS 54-2009 2/1979 Japan .................................. 181/294
1052865 12/1966 United Kingdom ................ 181/288

Primary Examiner—Benjamin R. Fuller
Attorney, Agent, or Firm—Frishauf, Holtz, Goodman and Woodward

[57] ABSTRACT

A sound-damping mat or drape comprises a flexible layer (5) having distributed therein particles (5) of a higher specific gravity than the material of the flexible layer. The flexible layer comprises a material having open pores and the pores are filled over at least a part of the thickness of the layer with said particles. The particles are bound to each other and to the defining walls of the pores. The mat or drape is preferably manufactured by vibrating the heavy particles down into the pores of the porous flexible layer, whereafter a binder is sprayed over the surface of the layer.

8 Claims, 10 Drawing Figures

U.S. Patent  Jun. 7, 1983  4,386,676
Fig. 1
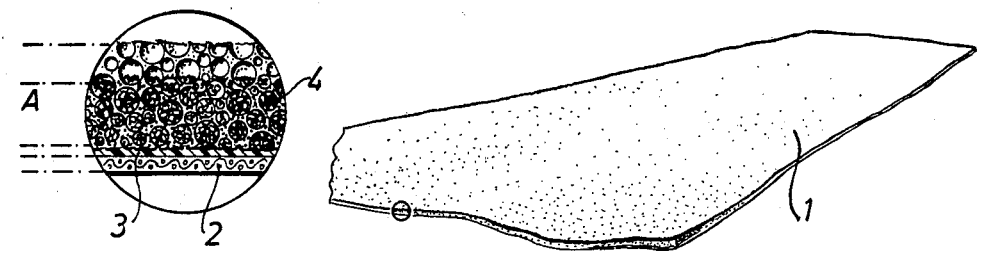
Fig. 1A
Fig. 2  Fig. 2A
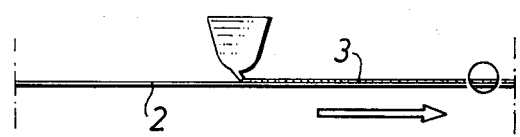
Fig. 3  Fig. 3A
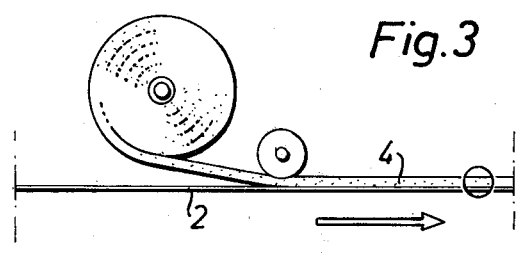
Fig. 4  Fig. 4A
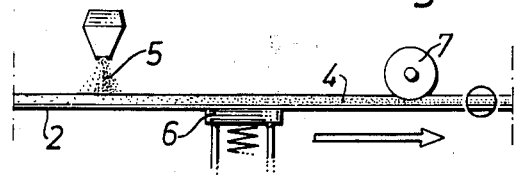
Fig. 5  Fig. 5A
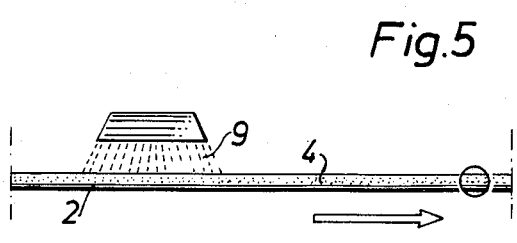

SOUND-DAMPING MAT OR DRAPE

BACKGROUND OF THE INVENTION

The present invention relates to a sound-damping mat or drape, comprising a flexible layer having distributed therein particles whose specific gravity is higher than the material of said flexible layer.

The sound-damping properties of a layer as described above are, inter alia, dependent upon the mass of the layer per surface unit area. Previously it has been suggested to incorporate into a layer of a flexible material a further material of higher specific weight, by rolling or by other means. It has also been suggested to arrange relatively large bodies of material in pockets provided in a flexible layer. Both of these methods, however, afford relatively limited possibilities of introducing large quantities of heavy media in a flexible layer. Further, such layers obtain a relatively smooth, sound-reflecting surface.

A main object of the present invention is to provide a sound-damping mat or drape of the type described above, which, while retaining a high degree of flexibility, is able to contain a high amount of heavy media.

SUMMARY OF THE INVENTION

In accordance with the invention, the flexible layer of a sound-damping mat or drape comprises a material having open pores which are filled over at least a part of the thickness of the layer with said whose specific gravity is higher than that of the flexible layer, the particles being bound to each other and also to the defining walls of said pores.

By using a highly porous material which to a major extent includes air-filled, mutually communicating cavities defined by extremely thin walls, it is possible to incorporate a far higher percentage of heavy media than was hitherto possible. This improves the sound-insulating properties of the layer to a very great extent. Further, if the aforementioned layer is not filled completely with said heavy media there is obtained an extremely non-uniform and cavitated surface, which adds to the sound-insulating ability of the layer a substantial sound-absorbing effect.

Preferably the particles are bound to each other and to the defining walls of the pores by means of a binder, which forms an elastic coating on the particles. Together with the flexibility of the layer, this contributes to preventing resonance phenomena.

In a preferred embodiment, the flexible layer comprises a cellular plastic having open cells, said cellular-plastic layer being attached to a carrier and filled with particles from the contact surface with said carrier and over at least half the thickness of the layer. The sound-absorbing properties of such a layer are extremely good at thicknesses as small as 3–5 mm, and the material can be readily draped over surfaces which exhibit double-curves, too. By attaching the layer to a flexible carrier it is possible, for example, to provide drapes, mats and also curtains for rolling having extremely good sound-damping properties. With surface weights of 7–8 kg, a sound-damping effect of 25–30 dBA is obtained. The particles used in accordance with the invention may be metal concentrates, crushed mineral material, sand or the like.

A drape or mat in accordance with the above is manufactured in accordance with the invention by spreading the particles of the heavier material over the flexible layer and vibrating said layer so that the particles enter the open pores in said flexible layer, and by subsequently applying a binder capable of binding the particles together and to the defining walls of the pores.

In this respect it is preferred that substantially all pores in the flexible layer are first filled with particles and that particles are then removed from the pores in one surface portion of said layer with the aid of a brush-roll or the like, which is caused to pass over the layer. The flexible layer is preferably bonded to a carrier prior to vibrating the particles into the pores. To further reduce the risk of said resonance phenomena, the particles can be coated with a thin, resilient layer before being vibrated down into the pores. The binder used is preferably a water-based adhesive which is sprayed over the layer.

A sound-absorbing mat or drape in accordance with the above can be used with or without a carrier. When using the mat or drape for insulating structural-sounds, the carrier is preferably omitted, and the flexible layer is placed directly on the supporting surface or substrate as the layer is able to drape or to conform in shape to the shape of the surfaces of the supporting layer.

As previously mentioned, when manufacturing sound-damping drapes, mats or curtains, the flexible layer is suitably arranged on a flexible carrier, such as a strong sheet of pliable material or foil material or the like. The flexible layer, however, may also be applied directly to rigid building plates or the like.

BRIEF DESCRIPTION OF THE DRAWINGS

The invention will now be described in more detail with reference to the accompanying schematic drawings, in which FIGS. 1 and 1A illustrate a sound-damp drape or mat constructed in accordance with the invention, FIG. 1A being an enlarged cross-sectional view of a portion thereof; and FIGS. 2, 2A, 3, 3A, 4, 4A, 5 and 5A illustrate the different stages in the manufacture of the mat or drape illustrated in FIG. 1.

DETAILED DESCRIPTION

The flexible sound-damping mat 1 in FIG. 1 comprises, as will be seen from the enlarged part-sectional view of FIG. 1A, a thin, flexible carrier 2, e.g. a glass-fiber fabric, an adhesive layer 3 applied to said carrier 2, and a layer 4 of a porous, flexible material having open pores and fastened to said carrier 2 by means of the adhesive layer 3, said porous, flexible material 4 for instance comprising a cellular plastic material having open cells. The cells in the layer 4 are filled, up to a level identified by the reference A, with a particulate material 5 (see FIGS. 4A and 5A) having a higher specific gravity than the plastic material 4. As a result of the very thin walls in the network structure formed by the cellular plastic, the layer 4 will contain a very high percentage of heavy media up to the level A. This means that the sound-insulating effect imparted to the layer is very good. The pores in the upper surface layer of the layer 4 have purposely been left unfilled, which means that the layer 4 has an irregular and rough upper surface, resulting in a good sound-absorbing effect. Thus, by means of the invention there can be obtained in one and the same element a sound-insulating and a sound-absorption effect.

When manufacturing the drape or mat according to FIG. 1, a layer of adhesive 3 is first spread, as shown in FIG. 2, on the glass-fiber fabric 2. The adhesive is selected in dependence on the material from which the carrier 2 is made and on the material of the porous layer 4 applied to the adhesive layer, see FIG. 3. In addition to any chemical bonding to the layer 4, there is obtained a good mechanical anchorage of said layer 4 as a result of penetration of the adhesive into the open cells thereof.

FIG. 4 illustrates, how, in accordance with the invention, the heavy, particulate material 5 is spread over the porous layer 4, said material 5 being caused to penetrate the flexible layer 4 and to completely fill the cells therein by means of a suitable vibrating device 6. The layer 4 is then caused to pass a brush roller 7, which squeezes the upper part of the flexible layer in a manner to remove that particulate material present in the cells of layer 4 located nearest the upper surface. Subsequent to the roller 7 having passed over said layer 4, the layer again expands, whereat a cross section therethrough obtains an appearance such as that illustrated schematically in the enlarged part-sectional view of FIG. 4A.

FIG. 5 illustrates the manufacturing step in which the particles 5 are bound to each other and to the defining walls of the pores in the flexible layer 4. This bonding of the particles is effected by spraying an adhesive over the web of material, which adhesive, inter alia as a result of capillary forces, penetrates the pores and surrounds the particles 5. The adhesive used may be a readily flowable, water-diluted and water-based latex adhesive, which may also be admixed with a wetting agent. Such adhesive forms an elastic coating on the particles. In one experiment carried out in this respect, one part of Casco textile glue number 3180, 97 parts of water and 2 parts of wetting agent were mixed together, said mixture giving satisfactory results. If a stronger bond is required, the concentration of textile glue can be increased.

Experiments have shown that when applying a method of manufacture according to the above, using an open cellular plastic as a flexible layer and iron concentrates as said heavy media, a heavy-medium content exceeding 95% of the total weight can be achieved.

For the purpose of filling the cells to a satisfactory extent there is suitably used a heavy medium of varying particle size. The mean size of the particles 5 should be about 0.1 mm. By using a non-combustible polyether cellular plastic, for example mounted on a glass-fiber fabric, there can be produced a sound-damping mat or drape which comprises practically 100% non-cumbustible material. In addition to absorbing sound, such a mat or drape is also largely fireproof. In addition to cellular plastic, the flexible layer may comprise felt material, non-woven material, natural materials, such as hairfelts, stone wool, glass-wool or the like.

In addition to glass fibre, the carrier may also comprise a canvas material, jute, synthetic fiber or suitable foil material. The flexible carrier may also be exchanged for a rigid building element or the like. If the flexible layer is used without a carrier, said layer may be draped directly over a shaped surface or arranged as a partition wall, as a screen against a noisy environment.

A balance between the insulating and absorption effect of the mat or drape can be obtained as desired by deciding how much of the thickness of the flexible layer shall remain unfilled. As will be understood, the layer may be completely filled in order to obtain a substantially smooth surface.

For the purpose of obtaining further improved insulation properties, the particles may be coated with a very thin layer of resilient material prior to being shaken down into the elastic layer. This can be effected in a mixer, wherein 500 grams of rubber material thinned with white sprits can be added for each 100 kg of heavy medium. Subsequent to moistening the heavy medium, the particles must be provided with a further layer, in order to prevent said particles from sticking together. This can be achieved by mixing the plastic with a plastics powder which has been extremely finely divided, for example a polyethylene powder sold by DuPont under the name Mikrothen. Approximately 500 grams of plastic powder is added to a batch of particles in accordance with the aforegoing. This will enable the particles to move relative to one another in a ready manner, similar to that prior to said particles being coated with said rubber substance. The difference, however, is that each particle is encased in a thin layer of resilient material, which further reduces the possibility of sound waves propagating from particle to particle.

When manufacturing a flexible layer without said carrier, said flexible layer is suitably temporarily provided on one side thereof with a retaining layer prior to said heavy medium and said adhesive being caused to fill the cells of said layer, thereby to prevent the heavier material from passing straight through the layer. This retaining layer is attached by means of a weak glue, such as a wallpaper paste. Subsequent to the mat of drape being dried, said retaining layer is removed, optionally for reuse.

The aforedescribed embodiments are not restrictive of the invention, but can be modified within the scope of the following claims. The only essential prerequisite is that the starting material used for a sound-damping mat or drape is a flexible porous material having open pores which are filled with a desired heavy medium.

What is claimed is:

1. A sound-damping mat or drape comprising:
   a flexible layer made of an open cellular material of given thickness, said open cellular material having open pores and walls between said open pores, said walls having wall surfaces defining said open pores;
   a plurality of particles of a higher specific gravity than the material from which said flexible layer is made, said particles filling said pores over at least half of the thickness of said layer, said particles substantially not being embedded in said walls between said open pores;
   the open pores at at least one surface of said flexible layer being unfilled with said particles to thereby provide a rough sound-absorbing surface; and
   bonding means forming an elastic coating on said particles and for bonding said particles to each other and to the defining wall surfaces of said filled pores, said bonding means comprising an adhesive which forms said elastic coating on said particles.

2. The sound-damping mat or drape of claim 1, further comprising a carrier bonded to said flexible layer; and wherein the filled pores of said flexible layer are filled with said particles from the contact surface with said carrier and over at least half the thickness of said flexible layer.

3. The sound-damping mat or drape of claim 2, wherein said carrier comprises a flexible sheet material.

4. The sound-damping mat or drape of claim 1 further comprising a carrier bonded to said flexible layer.

5. The sound-damping mat or drape of claim 4, wherein said carrier comprises a flexible sheet material.

6. The sound-damping mat or drape of claim 2, wherein said flexible layer is an open cellular plastic material.

7. The sound-damping mat or drape of any one of claims 1, 2, 3, 4 or 5, wherein said particles comprise at least one of metal concentrates, crushed mineral material, sand or the like.

8. The sound-damping mat or drape of claim 1, wherein said bonding means comprises a water-based adhesive.

* * * * *